United States Patent
Gupta et al.

(10) Patent No.: US 8,589,923 B2
(45) Date of Patent: *Nov. 19, 2013

(54) PREPROVISIONING VIRTUAL MACHINES BASED ON REQUEST FREQUENCY AND CURRENT NETWORK CONFIGURATION

(75) Inventors: Manish Gupta, New Delhi (IN); Neeran M. Karnik, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,705

(22) Filed: Apr. 10, 2012

(65) Prior Publication Data

US 2012/0198451 A1 Aug. 2, 2012

Related U.S. Application Data

(63) Continuation of application No. 12/904,259, filed on Oct. 14, 2010.

(51) Int. Cl.
- *G06F 9/455* (2006.01)
- *G06F 9/46* (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 7,197,564 B1 * | 3/2007 | Bhoj et al. ................... | 709/225 |
| 2005/0198303 A1 | 9/2005 | Knauerhase et al. | |
| 2005/0283759 A1 * | 12/2005 | Peteanu et al. ............... | 717/120 |
| 2006/0013229 A1 * | 1/2006 | Johansson et al. ....... | 370/395.41 |
| 2007/0101377 A1 * | 5/2007 | Six et al. ....................... | 725/86 |
| 2007/0106798 A1 * | 5/2007 | Masumitsu et al. .......... | 709/226 |
| 2007/0288224 A1 | 12/2007 | Sundarrajan et al. | |
| 2008/0034370 A1 * | 2/2008 | Huizenga .................... | 718/104 |
| 2008/0172673 A1 * | 7/2008 | Naik ............................ | 718/104 |
| 2009/0282404 A1 | 11/2009 | Khandekar et al. | |
| 2010/0218192 A1 * | 8/2010 | Dunn ........................... | 718/104 |
| 2010/0220613 A1 * | 9/2010 | Hendriks et al. ............. | 370/252 |
| 2011/0231696 A1 * | 9/2011 | Ji et al. ............................ | 714/3 |

FOREIGN PATENT DOCUMENTS

WO 2009111799 9/2009

OTHER PUBLICATIONS

Chen, Bin, et al.; Fast, On-demand Software Deployment with Lightweight, Independent Virtual Disk Images; Eighth International Conference on Grid and Cooperative Computing; 2009; pp. 1-8.

Lagar-Cavilla, Andres H., et al.; SnowFlock: Rapid Virtual Machine Cloning for Cloud Computing; 3rd European Conference on Computer Systems (Eurosys); Apr. 2009; pp. 1-12.

Sun, Yifeng, et al.; Fast Live Cloning of Virtual Machine Based on Xen; 11th IEEE International Conference on High Performance Computing and Communications; 2009; pp. 1-8.

\* cited by examiner

*Primary Examiner* — Abdullah Al Kawsar
*Assistant Examiner* — Benjamin Wu
(74) *Attorney, Agent, or Firm* — James L. Baudino; Matthew B. Talpis

(57) ABSTRACT

According to one aspect of the present disclosure, a method and technique for preprovisioning virtual machines is disclosed. The method includes analyzing requests for a plurality of different virtual machine (VM) configurations where each VM configuration has a plurality of configuration attributes. The method also includes determining a request frequency corresponding to each requested VM configuration, determining a configuration of each provisioned VM, and responsive to determining the configuration of each provisioned VM, determining a configuration for a preprovisioned VM based on a request frequency of the different VM configurations and the configurations of the provisioned VMs. The method further includes creating the preprovisioned VM.

13 Claims, 4 Drawing Sheets

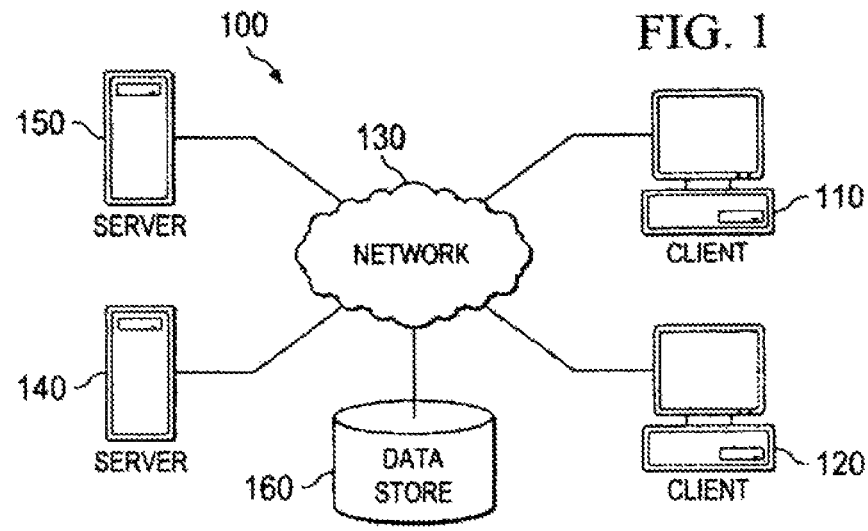
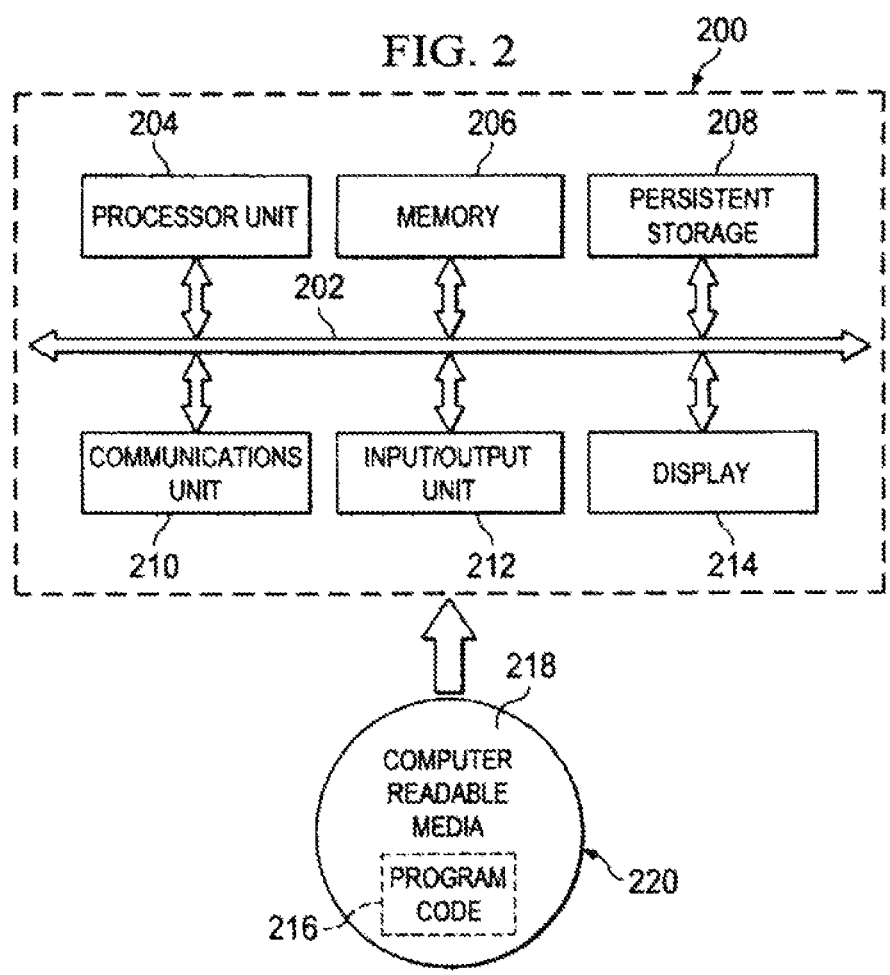

PREPROVISIONING VIRTUAL MACHINES BASED ON REQUEST FREQUENCY AND CURRENT NETWORK CONFIGURATION

BACKGROUND

A networked computer environment may include many attached devices offering and/or seeking various types of computing services. Various types of resources and/or computing services may be hosted at different nodes on a network by different processing systems. Each node may include a hardware resource or a collection of hardware resources each configurable with different hardware, firmware and/or software resources. In a multi-user environment, the services needed may vary considerably. Thus, a virtual machine environment enables different types of computing resources to be provisioned at various nodes of the network to meet the varying needs of requesting devices. For example, in response to receiving a request for a particular computing resource, a virtual machine manager or processing system analyzes available virtual machines on the network and either allocates an existing virtual machine to the request or creates a virtual machine to meet the request.

BRIEF SUMMARY

According to one aspect of the present disclosure a method and technique for preprovisioning virtual machines is disclosed. The method includes analyzing requests for a plurality of different virtual machine (VM) configurations where each VM configuration has a plurality of configuration attributes. The method also includes determining a request frequency corresponding to each requested VM configuration, determining a configuration of each provisioned VM, and responsive to determining the configuration of each provisioned VM, determining a configuration for a preprovisioned VM based on a request frequency of the different VM configurations and the configurations of the provisioned VMs. The method further includes creating the preprovisioned VM.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 1 is an embodiment of a network of data processing systems in which the illustrative embodiments of the present disclosure may be implemented;

FIG. 2 is an embodiment of a data processing system in which the illustrative embodiments of the present disclosure may be implemented;

DETAILED DESCRIPTION

Figure 3:
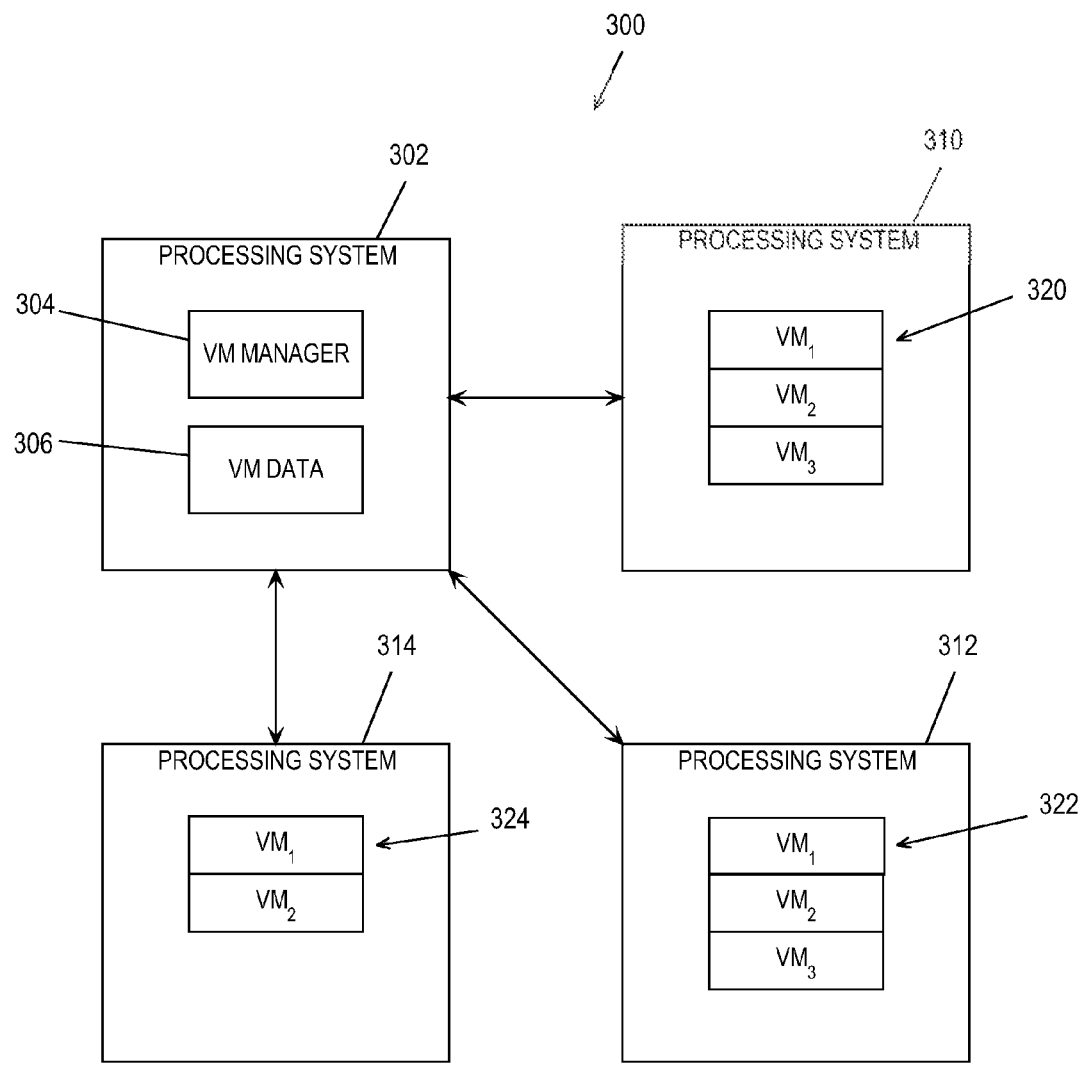
FIG. 3 is a diagram illustrating an embodiment of a data processing system in which illustrative embodiments of a virtual machine preprovisioning system may be implemented.

Embodiments of the present disclosure provide a method, system and computer program product for preprovisioning virtual machines. For example, in some embodiments, based on a frequency that different virtual machine configurations are requested, particular configurations of virtual machines are preprovisioned on a network in anticipation of virtual machine requests. In some embodiments, the frequency of the different virtual machine configurations is analyzed considering configuration attributes such as the requested operating system, the requested central processing unit(s), the requested memory capacity, and/or the requested hard disk size. Thus, embodiments of the present disclosure enable preprovisioning of virtual machines based on the frequency that different virtual machine configurations are requested.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

FIG. 3 is an illustrative embodiment of a system 300 for preprovisioning virtual machines (VMs). System 300 may be implemented on a data processing system or platform such as, but not limited to, servers 140 and/or 150, clients 110 and/or 120, or at other data processing system locations. In the embodiment illustrated in FIG. 3, system 300 comprises a processing system 302 hosting a VM manager 304 and VM data 306. In the illustrated embodiment, processing system 302 is networked with processing systems 310, 312 and 314 each hosting one or more VMs 320, 322 and 324, respectively. It should be understood that a greater or fewer quantity of processing systems may be networked. It should also be understood that the quantity VMs configured on each processing system 310, 312 and 314 may vary.

In FIG. 3, VM manager 304 receives requests for computing resources (e.g., from clients 110 and 120 or other networked devices) and creates and/or allocates VMs 320, 322 and/or 324 responsive to such requests. VM manager may select particular VMs 320, 322 and/or 324 that match or closely match the request or create a new VM to accommodate the request. In some embodiments, VM data 302 comprises historical information based on the configurations of VMs requested. In some embodiments, VM manager 304 uses VM data to determine the frequency certain VM configurations are requested and preprovisions various configuration of VM on the network in anticipation of future requests for services.

Figure 4:
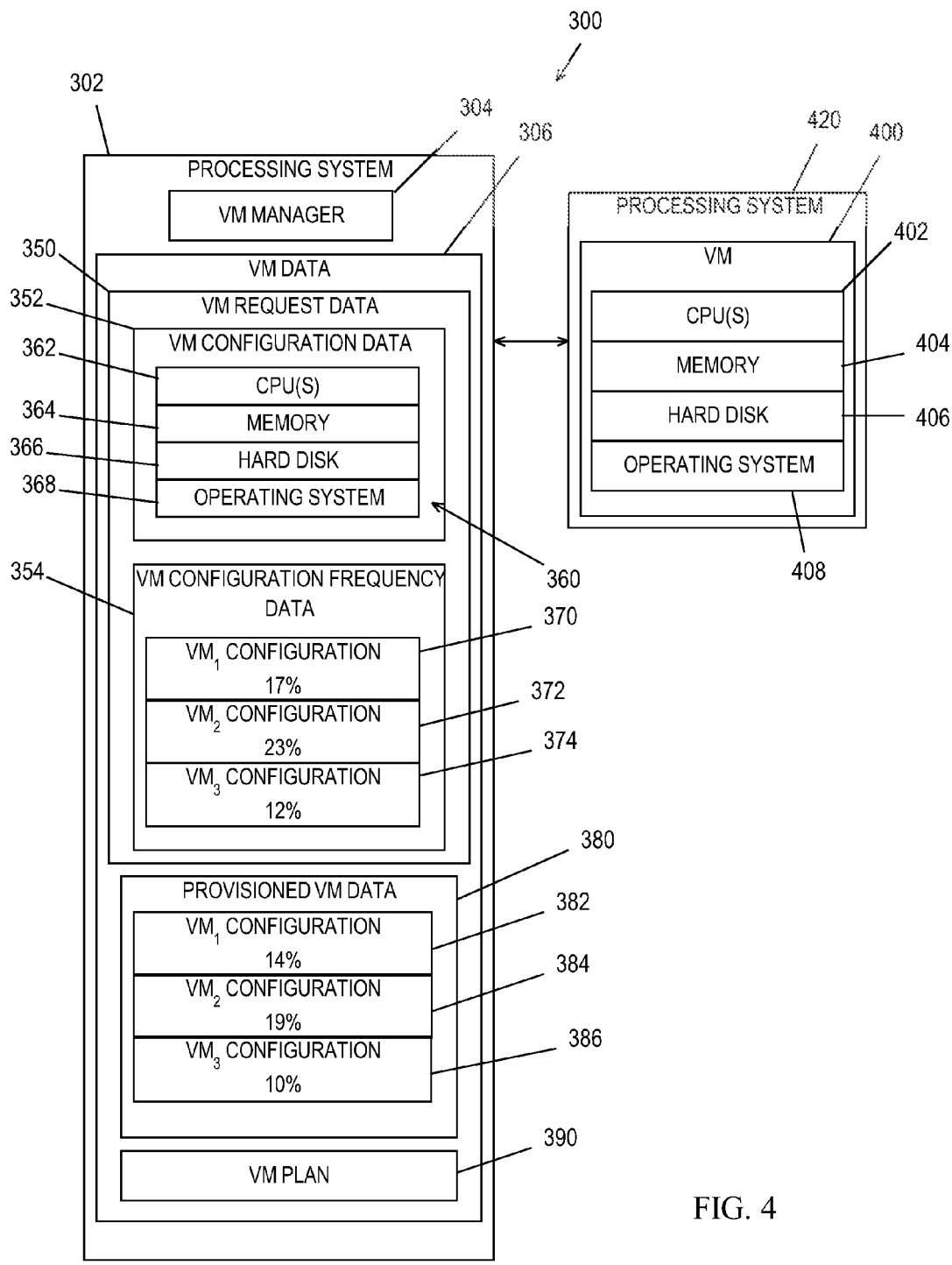
FIG. 4 is a diagram illustrating an embodiment of a data processing system in which illustrative embodiments of a virtual machine manager of virtual machine preprovisioning system may be implemented.

FIG. 4 is an illustrative embodiment of processing system 302 of system 300. In the illustrated embodiment, processing system 302 comprises VM manager 304 and VM data 306. VM manager may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, VM data 306 includes VM request data 350 comprising information associated with requested configurations of VMs. For example, in FIG. 4, VM request data 350 comprises VM configuration data 352 and VM configuration frequency data 354. VM configuration data 352 comprises information associated with each type of VM configuration requested by networked devices. Each type of VM configuration generally includes different VM configuration attributes 360. In some embodiments, the VM configuration attributes 360 that are monitored and/or analyzed include central processing unit(s) (CPUs) 362, memory capacity 364, hard disk size 366 and operating system 368. However, it should be understood that the VM configuration attributes may vary. Thus, for example, for each type of requested configuration of a VM, VM manager 304 analyzes and/or records the type, quantity, processing speed or other attribute of the requested CPU(s); the types, capacities or other attributes of requested memory 364; the type, size and/or other attributes of a requested hard disk 366; and the requested operating system 368. Each set of attributes corresponds to a particular VM configuration.

VM configuration frequency data 354 comprises information associated with the frequency each VM configuration is requested. For example, in some embodiments, VM manager 304 accesses and/or otherwise analyzes the requested VM configuration data 352 and determines the frequency each VM configuration is requested. In FIG. 4, several different VM configurations are illustrated having associated therewith a frequency designation indicating the frequency the particular VM configuration is requested. For example, in FIG. 4, VM configuration 370 has a frequency designation of 17%, VM configuration 372 has a frequency designation of 23%, and VM configuration 374 has a frequency designation of 12%. Each VM configuration represents a particular set of configuration attributes (e.g., CPU(s) 362, memory 364, hard disk 366 and operating system 368).

In FIG. 4, VM data 306 also includes provisioned VM data 380. Provisioned VM data 380 comprises information associated with the various configurations of VMs provisioned on the network. The provisioned VMs may comprise VMs in an active state or VMs residing in a suspended or hibernation state. For example, provisioned VM data 380 may include the percentage or quantity of each different VM configuration provisioned on the network. Thus, for example, in FIG. 4, 14% of the VMs configured on the network have a particular set of configuration attributes designated by VM configuration 382, 19% of the VMs configured on the network have a particular set of configuration attributes designated by VM configuration 384, and 10% of the VMs configured on the network have a particular set of configuration attributes designated by VM configuration 386.

In operation, VM manager 304 analyzes the frequency that particular VM configurations are requested and preprovisions VMs on the network in anticipation of future requests. For example, in some embodiments VM manager 304 determines a VM plan 390 representing a combination of VM configurations on the network based on the frequency certain VM configurations have been requested. VM manager 304 preprovisions different VM configurations at various nodes on the network corresponding to the VM plan 390. For example, a particular preprovisioned VM 400 may include a particular set of configuration attributes including CPU(s) 402, memory 404 capacity, hard disk 406 size and a particular operating system 408 and configured to reside on a processing system 420. VM manager 304 preprovisions VM 400 according to VM plan 390 and places VM 400 is a suspended state awaiting a request for computing resources. Thus, VM manager 304 analyzes previous requests for VM configurations and predicts a set of VM configurations for preprovisioning on the network. Based on historical VM configuration requests, VM manager 304 predicts the VM configurations that will likely be requested and formulates and/or otherwise generates or modifies VM plan 390 to preprovision various VM configurations on the network in advance of such requests. It should be understood that VM plan 390 may also be administratively driven or modified. For example, in some embodiments, an administrator or other entity may define that certain VM configurations shall be included in VM plan 390, which may also include the number of instances of certain VM configurations. VM manager 304 may also be configured to derive VM plan 390 by selecting a certain number of the most frequently requested VM configurations (e.g., the top three most requested) and preprovision some quantity of instances of the selected VM configurations.

In some embodiments, VM manager 304 preprovisions VMs based on available capacity at one or more nodes on the network. For example, in some embodiments, a particular capacity threshold may be selected such that, if remaining capacity exists at a particular node on the network, VM manager 304 preprovisions a particular VM configuration based on VM plan 390 within the capacity threshold or limit. VM manager 304 may dynamically update and preprovision VMs based on a variety of factors or events such as, but not limited to, deprovisioning of one or more VMs, according to a preset schedule or time interval, or in response to one or more received requests for computing resources. VM manager 304 may also be requested to update and preprovision VMs (e.g., by an administrator request). For example, in some embodiments, VM manager 304 compares provisioned VM data 380 representing the currently provisioned VMs on the network with VM plan 390. Based on a comparison the currently provisioned VMs on the network and the VM plan 390, VM manager 304 may deprovision certain VM configurations and/or preprovision certain VM configurations.

Figure 5:
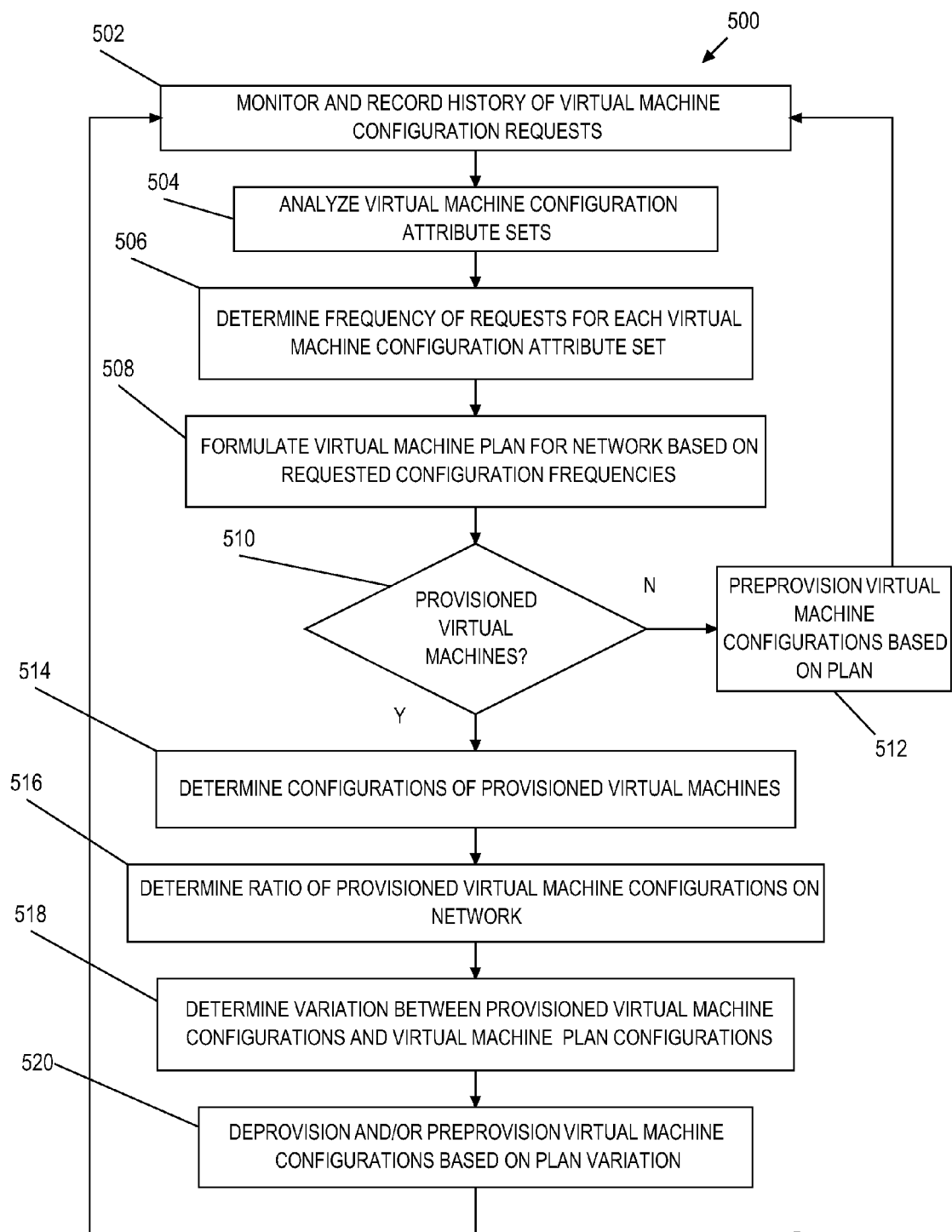
FIG. 5 is a flow diagram illustrating an embodiment of a virtual machine preprovisioning method.

FIG. 5 is a flow diagram illustrating an embodiment of a method 500 for preprovisioning virtual machines. The method begins at block 502, where VM manager 304 monitors and/or records a history of VM configuration requests. At block 504, VM manager 304 analyzes the VM request data 350 to identify the different types of VM configurations requested on the network. At block 506, VM manager 304 determines a request frequency for each VM configuration. As discussed above, each VM configuration includes various different configuration attributes (e.g., CPU(s), memory, hard disk, operating system, etc.) such that each particular set or combination of attributes corresponds to a particular VM configuration.

At block 508, VM manager 304 formulates and/or otherwise determines VM plan 390 for the network. As discussed above, VM plan 390 may represent a desired or optimum array or collection of different VM configurations on the network to accommodate anticipated VM requests. At decisional block 510, a determine is made whether VMs have previously been provisioned on the network. If not, the method proceeds to block 512, where VM manager 304 preprovisions one or more VM configurations for the network based on VM plan 390. The method then proceeds to block 502, where VM manager 304 continues to monitor and track the requests for VMs. If VMs have been previously provisioned on the network, the method proceeds from decisional block 510 to block 514, where VM manager 304 determines the configurations for the provisioned VMs on the network. At block 516, VM manager 304 determines the ratio or composition of different VM configurations provisioned on the network. At block 518, VM manager 304 compares the provisioned VM configurations on the network with the desired allocation of VM configurations for the network based on VM plan 390. At block 520, VM manager 304 preprovisions and/or deprovisions VM configurations on the network based on the variation between currently provisioned VM configurations and VM plan 390. For example, in some embodiments, VM manager 304 may preprovision additional VM configurations across the network to correspond with or more closely correspond with VM plan 390 for the network. In some embodiments, the variation between currently provisioned VMs and VM plan 390 may result in various VM configurations residing on the network being deprovisioned alone or in combinations with the preprovisioning of other VM configurations. The method then proceeds to block 502, where VM manager 304 continues to monitor and analyze requests for different VM configurations. It should be understood that various functions or processes described above in connection with method 500 may be performed at different times and/or at different locations within system 300.

Thus, embodiments of the present disclosure enable preprovisioning of VMs across a network based on anticipated requests for various VM configurations. Embodiments of the present disclosure reduce latency associated with meeting requests for computing resources by preprovisioning different configurations of VMs across the network based on the frequency different VM configurations have previously been requested.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving requests for computing resources on a network;
   analyzing the requests to identify each different virtual machine (VM) configuration, each VM configuration having a plurality of configuration attributes;
   determining a request frequency corresponding to each requested VM configuration;
   determining a configuration of each provisioned VM;
   responsive to determining the configuration of each provisioned VM, determining a configuration for a preprovisioned VM based on the request frequency of the requested VM configurations and the configurations of the provisioned VMs;
   determining a remaining capacity on the network for the preprovisioned VM; and
   responsive to determining that the remaining capacity can accommodate the preprovisioned VM, creating the preprovisioned VM on the network.

2. The method of claim 1, wherein analyzing the requests comprises analyzing at least one of a central processing unit (CPU) configuration attribute, an operating system configuration attribute, a hard disk configuration attribute and a memory configuration attribute for the requested VM.

3. The method of claim 1, further comprising, responsive to a deprovisioning of a VM, determining a configuration for a preprovisioned VM based on a request frequency of the different VM configurations and the configurations of the remaining provisioned VMs.

4. The method of claim 1, further comprising determining a VM plan indicating a desired array of VM configurations for the network based on the request frequency corresponding to each requested VM configuration.

5. The method of claim 4, further comprising comparing the VM plan to the provisioned VM configurations.

6. The method of claim 1, further comprising, responsive to allocating a VM to a request, determining a configuration for another preprovisioned VM.

7. The method of claim 1, further comprising determining whether to create the preprovisioned VM according to a predefined schedule.

8. The method of claim 1, wherein determining the configuration for the preprovisioned VM comprises selecting a CPU attribute, a memory attribute, a hard disk attribute and an operating system attribute.

9. A method comprising:
   receiving requests for computing resources on a network;
   analyzing the requests to identify each different virtual machine (VM) configuration, each VM configuration having a plurality of configuration attributes;
   determining a request frequency corresponding to each requested VM configuration;
   determining a VM plan for the network, the VM plan representing a desired array of preprovisioned VM configurations for the network based on the request frequency; and
   determining a capacity on the network for the preprovisioned VMs and, based on the capacity, creating a plurality of preprovisioned VMs on the network corresponding to the VM plan.

10. The method of claim 9, wherein analyzing comprises identifying for each requested VM configuration a central processing unit (CPU) attribute, a memory attribute, a hard disk attribute and an operating system attribute.

11. The method of claim 9, further comprising comparing the VM plan to provisioned VM configurations residing on the network.

12. The method of claim 11, wherein creating the plurality of preprovisioned VMs comprises, for each preprovisioned VM, selecting a VM configuration defined by a CPU attribute, a memory attribute, a hard disk attribute and an operating system attribute.

13. A method comprising:
   analyzing requests for a plurality of different virtual machine (VM) configurations for a network, each VM configuration having a plurality of configuration attributes, the plurality of configuration attributes comprising a central processing unit (CPU) attribute, a memory attribute, and an operating system attribute;
   determining a request frequency corresponding to each requested VM configuration;
   determining a configuration of each provisioned VM;
   responsive to determining the configuration of each provisioned VM, determining a configuration for a preprovisioned VM based on the request frequency of the requested VM configurations and the configurations of the provisioned VMs;
   identifying a capacity threshold for each node on the network;
   identifying one or more nodes on the network where creation of the preprovisioned VM would be within the capacity threshold for the respective nodes; and
   responsive to identifying one or more nodes on the network where creation of the preprovisioned VM would be within the capacity threshold for the respective nodes, creating the preprovisioned VM on at least one of the identified nodes of the network.

* * * * *